(12) United States Patent
Sprouse et al.

(10) Patent No.: US 7,547,419 B2
(45) Date of Patent: Jun. 16, 2009

(54) TWO PHASE INJECTOR FOR FLUIDIZED BED REACTOR

(75) Inventors: Kenneth M Sprouse, Northridge, CA (US); Albert E. Stewart, Sylmar, CA (US)

(73) Assignee: United Technologies Corporation, Hartford, CT (US)

( * ) Notice: Subject to any disclaimer, the term of this patent is extended or adjusted under 35 U.S.C. 154(b) by 666 days.

(21) Appl. No.: 10/869,593

(22) Filed: Jun. 16, 2004

(65) Prior Publication Data

US 2005/0281720 A1    Dec. 22, 2005

(51) Int. Cl.
*F27B 15/08* (2006.01)
*B01J 8/18* (2006.01)
*B05B 7/06* (2006.01)
*B05B 7/04* (2006.01)
*B65G 51/18* (2006.01)
*B65G 51/24* (2006.01)

(52) U.S. Cl. .................. 422/145; 422/139; 239/428; 239/429; 239/430; 239/432; 239/433; 406/181

(58) Field of Classification Search ................ 422/145; 406/181; 239/433, 291, 292, 428–430, 432
See application file for complete search history.

(56) References Cited

U.S. PATENT DOCUMENTS

| 1,871,853 | A | * | 8/1932 | Kennedy | 406/181 |
|---|---|---|---|---|---|
| 3,856,658 | A | | 12/1974 | Wolk et al. | 208/415 |
| 3,953,356 | A | | 4/1976 | Tomita | 252/373 |
| 3,955,941 | A | * | 5/1976 | Houseman et al. | 48/95 |
| 4,017,278 | A | | 4/1977 | Reese | 95/268 |
| 4,025,457 | A | | 5/1977 | Tomita et al. | 252/373 |
| 4,080,550 | A | * | 3/1978 | Sheer et al. | 315/111.21 |
| 4,102,989 | A | * | 7/1978 | Wheelock | 423/541.1 |
| 4,191,500 | A | | 3/1980 | Oberg et al. | 406/146 |
| 4,197,092 | A | | 4/1980 | Bretz | 48/86 R |

(Continued)

OTHER PUBLICATIONS

Balasubramanian, B. Ortis, Lopez A., Kaytakoglu, S., Harrison, D.P. Hydrogen From Methane in a single Step Process, Chemical Engineering Science, 54, pp. 3543-3552 (1999).

(Continued)

*Primary Examiner*—Alexa D Neckel
*Assistant Examiner*—Matthew J Merkling
(74) *Attorney, Agent, or Firm*—Carlson, Gaskey & Olds, PC

(57) ABSTRACT

A fluidized-bed reactor for producing hydrogen from methane by steam reforming includes a flow splitter that splits a dense-phase flow of a gas having entrained calcium oxide particles into a plurality of equal flow streams. The reactor also incorporates an orifice plate having at least one high-velocity, rocket-style impinging injector for injecting reactants into the reactor bed. The injector includes a central orifice extending perpendicularly through the plate, and one or more adjacent peripheral orifices that extend through the plate at such an angle that respective streams of reactants injected into the reactor bed through the peripheral orifices impinge on a stream of reactants injected vertically into the reactor bed through the central orifice. The injector cooperates with adjacent base-bleed orifices in the plate to provide a uniform distribution and rapid mixing of the calcium oxide particles with a steam/methane gas mixture across the entire bottom of the reactor bed.

16 Claims, 3 Drawing Sheets

U.S. PATENT DOCUMENTS

| | | | |
|---|---|---|---|
| 4,323,538 A * | 4/1982 | Sinor | 422/207 |
| 4,391,561 A | 7/1983 | Smith et al. | 414/218 |
| 4,488,838 A | 12/1984 | Herud | 406/56 |
| 4,721,420 A | 1/1988 | Santhanam et al. | 406/197 |
| 4,776,860 A | 10/1988 | Najjar et al. | 48/197 R |
| 4,869,894 A | 9/1989 | Wang et al. | 423/650 |
| 4,946,667 A | 8/1990 | Beshty | 423/648.1 |
| 5,326,550 A * | 7/1994 | Adris et al. | 423/652 |
| 5,343,830 A | 9/1994 | Alexander et al. | 122/4 D |
| 5,525,322 A | 6/1996 | Willms | 423/653 |
| 5,558,473 A | 9/1996 | Lindahl | 406/61 |
| 5,612,012 A | 3/1997 | Soma et al. | 423/246 |
| 6,152,668 A | 11/2000 | Knoch | 414/164 |
| 6,221,117 B1 | 4/2001 | Edlund et al. | 48/76 |
| 6,269,778 B1 | 8/2001 | Anderson et al. | 122/4 D |
| 6,395,237 B1 | 5/2002 | Wietzke et al. | 422/171 |
| 6,418,973 B1 | 7/2002 | Cox et al. | 139/383 R |
| 6,497,856 B1 | 12/2002 | Lomax, Jr. et al. | 423/651 |
| 6,623,719 B2 | 9/2003 | Lomax, Jr. et al. | 423/652 |
| 6,673,133 B2 | 1/2004 | Sechrist et al. | 55/348 |
| 6,682,838 B2 | 1/2004 | Stevens | 429/17 |
| 6,713,040 B2 | 3/2004 | Ahmed et al. | 423/650 |
| 6,790,430 B1 | 9/2004 | Lackner et al. | 423/648.1 |
| 6,797,420 B2 | 9/2004 | Ukai et al. | 429/25 |
| 2004/0068932 A1 | 4/2004 | Stewart | 48/127.9 |
| 2004/0071618 A1 | 4/2004 | Stewart | 422/232 |

OTHER PUBLICATIONS

"MHD Coal Combustor Technology," Rockwell International, Final Report, Sep. 1980.

* cited by examiner

TWO PHASE INJECTOR FOR FLUIDIZED BED REACTOR

CROSS-REFERENCE TO RELATED APPLICATIONS

This application is related to U.S. Ser. No. 10/271,406, filed Oct. 15, 2002; U.S. Ser. No. 10/610,469, filed Jun. 30, 2003; U.S. Ser. No. 10/609,940, filed Jun. 30, 2003; and U.S. Ser. No. 10/869,643, entitled "DRY, LOW NITROUS OXIDE CALCINER INJECTOR", U.S. Ser. No. 10/869,644, entitled "HOT ROTARY SCREW PUMP", U.S. Ser. No. 10/869,642, entitled "SOLIDS MULTI-CLONE SEPARATOR", AND U.S. Ser. No. 10/869,641, entitled "HYDROGEN GENERATION SYSTEM WITH METHANATION UNIT" filed herewith, the respective disclosures of which are incorporated herein by this reference.

REFERENCE TO APPENDIX (Not Applicable)

BACKGROUND OF THE INVENTION

1. Field of the Invention

This invention relates to the large-scale production of commercially pure hydrogen gas in general, and in particular, to a dense-phase flow splitter and high-velocity, two-phase injector for use in a one-step, two-particle, fluidized-bed, steam-and-methane reactor used for such production.

2. Related Art

Hydrogen is one of the more common elements found in nature, and is present in many fuels, often combined with carbon, and in a large number of other organic and inorganic compounds. Hydrogen is widely used for upgrading petroleum "feed stocks" to more useful products. Hydrogen is also used in many chemical reactions, such as in the reduction or synthesizing of compounds, and as a primary chemical reactant in the production of many useful commercial products, such as cyclohexane, ammonia, and methanol.

In addition to the above uses, hydrogen is also quickly gaining a reputation as an "environmentally friendly" fuel because it reduces so-called "greenhouse emissions." In particular, hydrogen can drive a fuel cell to produce electricity, or can be used to produce a substantially "clean" source of electricity for powering industrial machines, automobiles, and other internal combustion-driven devices.

Hydrogen production systems include the recovery of hydrogen as a byproduct from various industrial processes, and the electrical decomposition of water. Presently, however, the most economical means is the removal of hydrogen from an existing organic compound. Several methods are known for removing or generating hydrogen from carbonaceous or hydrocarbon materials. And, although many hydrocarbon molecules can be "reformed" to liberate hydrogen atoms therefrom, the most commonly used is methane, or natural gas.

The use of hydrocarbons as hydrogen sources, or "feedstock" materials, has many inherent advantages. Hydrocarbon fuels are relatively common and sufficiently inexpensive to make large-scale hydrogen production from them economically feasible. Also, safe handling methods and transport mechanisms are sufficiently well-developed to enable safe and expeditious transport of the hydrocarbons for use in the different hydrogen reforming and other generation techniques.

Currently, the majority of commercial hydrogen production uses methane as a feedstock. Generally, steam-and-methane reformers, or "reactors," are used on the methane in large-scale industrial processes to liberate a stream of hydrogen gas. The generation of hydrogen from natural gas via steam reforming is a well-established commercial process. However, these commercial units tend to be extremely large and subject to significant amounts of "methane slip," i.e., methane feedstock that passes through the reformer unreacted. The presence of such methane (and other reactants or byproducts) serves to pollute the hydrogen, thereby rendering it unsuitable for most uses without further purification.

The disclosures in the above-referenced Related Applications detail the development by the Boeing Company of the "Boeing One Step Hydrogen" ("$BOSH_2$") process, which uses calcium oxide particles for the economical, large-scale production of hydrogen with yields that are both larger and purer than prior art processes. The $BOSH_2$ process comprises a "two-particle," fluidized-bed, steam reforming process that uses two types of solid particles: 1) Relatively large, porous particles of alumina ($Al_2O_3$) having a nickel (Ni) catalyst deposited on both their interior and exterior surfaces, for converting methane ($CH_4$) to hydrogen ($H_2$) via the reaction:

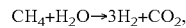

and (2) relatively small calcium oxide (CaO) particles for converting the gaseous carbon dioxide ($CO_2$) "byproduct" to solid calcium carbonate ($CaCO_3$) via the reaction:

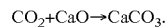

The fluidized bed reactor is operated so that the large alumina/nickel-catalyst particles remain within the fluidized bed at all times, while the smaller calcium oxide/carbonate particles are entrained with the gas and flow continuously through and out of the bed for subsequent separation and re-use of the calcium oxide $CO_2$-adsorbent.

Significant economic advantages have been shown in the size, throughput, and single-pass conversion efficiencies when using the $BOSH_2$ two-particle fluidized bed process in methane/steam reformer reactors described above. However, as this process has matured over time, certain technical issues have arisen that require resolution. One of these relates to the need for obtaining a very uniform distribution and rapid mixing of both the solid calcium oxide particles and the steam/methane gas mixture across the bottom of the fluidized catalyst bed of the reactor. Uniform splitting of entrained calcium-oxide-particle streams into multiple (i.e., on the order of 6 to 36) feed streams is problematic in dilute, two-phase pneumatic gas flows. The subsequent rapid mixing of these streams with the recirculating fluidized bed material is also important to prevent excessive hot spots within the bed, which could cause over-heating issues. This is because the reaction of the $CO_2$ with the calcium oxide is highly exothermic, and can potentially lead to local, destructive "hot zones" if not accurately counterbalanced by the highly endothermic methane/steam reaction. Therefore, good, uniform dispersions of the methane, steam, and calcium oxide reactants with the contents of the bulk fluidized bed at or near the bed's injectors is necessary and important to ensure reliable reactor operation.

BRIEF SUMMARY OF THE INVENTION

In accordance with the present invention, apparatus is provided for uniformly and reliably splitting a stream of entrained calcium oxide particles into multiple feed streams, and then injecting those streams, together with the steam/ methane gas mixture reactants, into the fluidized bed of a steam/methane reactor such that a very uniform distribution and rapid mixing of both the solid calcium oxide particles and the steam/methane gas mixture is achieved across the entire bottom of the fluidized bed of the reactor.

In one aspect of the invention, the apparatus comprises a very accurate, dense-phase (or "slurry") flow splitter for the entrained calcium oxide particle feed lines, and in another aspect, comprises a high velocity, "rocket-style" impinging injector with adjacent base-bleed nozzles, or orifices, for an effective reactant dispersion into the reactor's bed.

In one exemplary embodiment thereof, the dense-phase flow splitter comprises an elongated inlet tube having opposite inlet and outlet ends, and a plurality of elongated outlet tubes having opposite inlet and outlet ends. The inlet ends of the outlet tubes are coupled to the outlet end of the inlet tube such that a stream of a gas having particles of a solid entrained therein at or just below the static-bed bulk density of the particles and entering through the inlet tube of the splitter is equally divided among the outlet tubes into substantially equal, constituent dense-phase flows. The respective internal cross-sectional areas of the inlet tubes of the splitter are adjusted such that they are equal to each other and their sum is substantially equal to the internal cross-sectional area of the inlet tube. The interior surfaces of the tubes are made very smooth, and the tubes are configured such that any change in the axial direction of the flow of the stream through the splitter does not exceed about 10 degrees. Advantageously, the outlet tubes are round, or annular, and have a nominal diameter of not less than about 0.25 inches.

An exemplary high-velocity, rocket-style impinging injector for injecting reactants into the bed of the reactor comprises an orifice plate disposed horizontally within the reactor below the fluidized bed thereof. The plate includes a "primary," or central, orifice that extends substantially perpendicularly through the plate, and one or more "secondary," or peripheral, orifices disposed adjacent to the central orifice, which extend through the plate at such an angle that streams of reactants respectively injected into the reactor bed through the peripheral orifices impinge on a stream of reactants injected vertically into the reactor bed through the central orifice. For embodiments of the injector that comprise a plurality of the peripheral orifices, the latter are preferably arranged in the plate such that the streams of reactants respectively injected therethrough impinge on the stream of reactants injected through the central orifice at a common point, and at a common, acute angle.

An exemplary embodiment of an advantageous one-step, two-particle, fluidized-bed reactor for the production of hydrogen from methane by a steam reforming process comprises an elongated, vertical closed chamber. The chamber is divided into an upper, fluidized-bed chamber for containing a bed of catalyst particles, and a lower, gas-manifold chamber, by an orifice plate disposed horizontally within a lower portion of the chamber. The plate incorporates at least one of the above high-velocity, rocket-style impinging injectors in it for injecting reactants into the bed of the upper chamber, together with a plurality of "base-bleed" orifices disposed around the injector and extending substantially perpendicularly through the plate for injecting respective streams of reactants from the gas-manifold chamber into the fluidized-bed chamber. The outlet end of one of the outlet tubes of one of the above dense-phase flow splitters is coupled to the central orifice of the injector for injecting a gas, e.g., steam, methane, or a mixture thereof, having particles of calcium oxide entrained therein at or just below the static-bed bulk density of the particles, into the bed of the reactor, and the lower, gas- manifold chamber is pressurized with a mixture of steam and methane for injection thereof into the bed through the peripheral and the base-bleed orifices of the plate.

A better understanding of the above and many other features and advantages of the apparatus of the invention may be obtained from a consideration of the detailed description thereof below, particularly if such consideration is made in conjunction with the several views of the appended drawings.

DETAILED DESCRIPTION OF THE INVENTION

Figure 1:
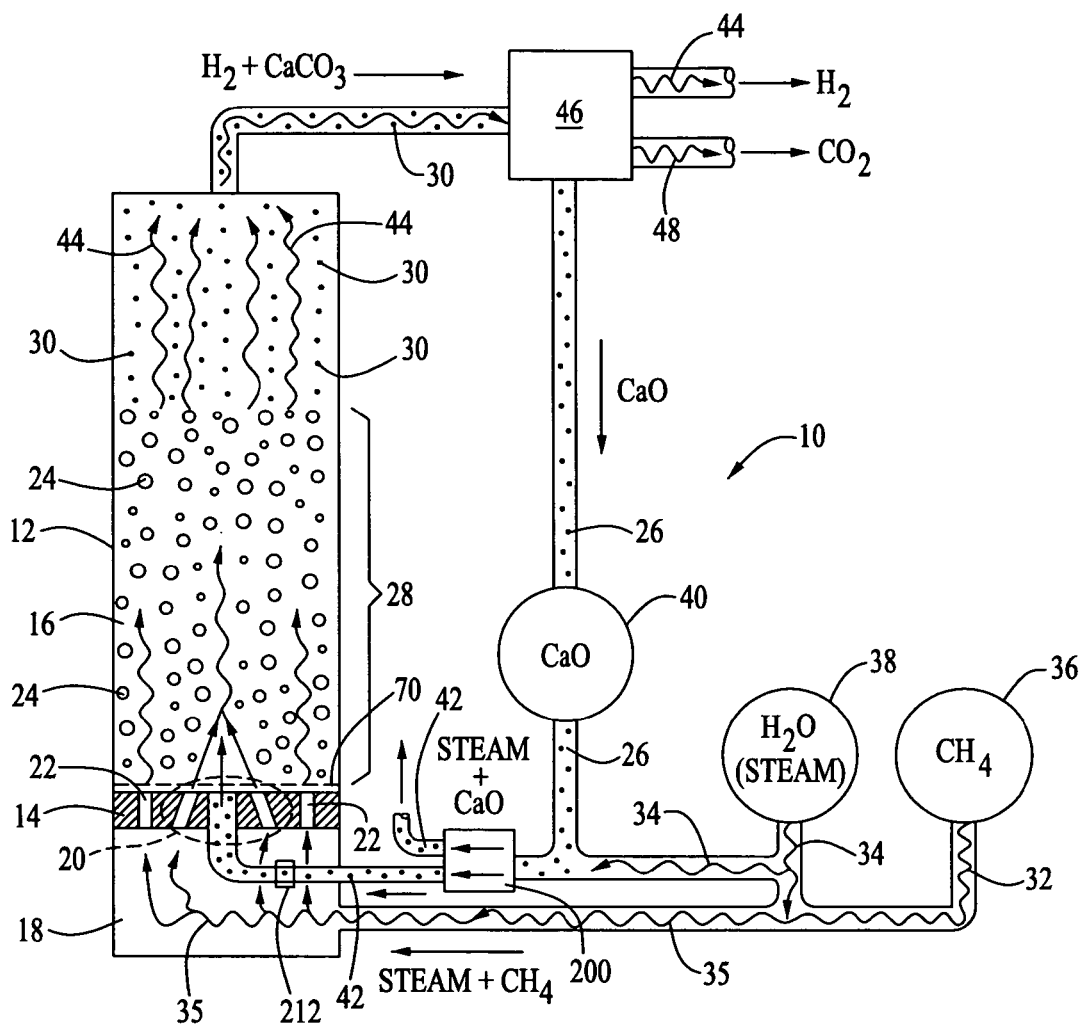
FIG. 1 is a schematic, cross-sectional elevation view of an exemplary embodiment of a one-step, two-particle, fluidized-bed reactor for the production of hydrogen from methane by a steam reforming process in accordance with the present invention.

A schematic, cross-sectional elevation view of an exemplary embodiment of a one-step, two-particle, fluidized-bed reactor 10 for the production of hydrogen from methane by a steam reforming process in accordance with the present invention is illustrated in FIG. 1. The reactor comprises an elongated, closed, vertical chamber 12. An orifice plate 14 is disposed horizontally within a lower portion of the reactor to define an upper, fluidized-bed reaction chamber 16 and a lower, pressurized-gas-manifold chamber 18, as shown. As described in more detail below, the orifice plate 14 also serves to define at least one high-velocity, "rocket-style" impinging injector 20 for injecting reactants into the fluidized-bed reaction chamber, together with a plurality of base-bleed orifices 22 disposed around the injector and extending substantially perpendicularly through the plate for injecting respective streams of reactants from the gas-manifold chamber into the fluidized-bed chamber, as described below.

The reactor 10 is referred to as a "two-particle" reactor because it uses two types of solid particles, viz., relatively large, porous particles 24 of alumina ($Al_2O_3$), which are plated with a nickel (Ni) catalyst, for converting a methane ($CH_4$) feedstock with steam ($H_2O$) in the presence of the nickel catalyst to hydrogen ($H_2$) and carbon dioxide ($CO_2$) gases via the endothermic reaction,

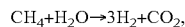

and relatively small calcium oxide (CaO) particles 26 for converting (i.e., adsorbing) the gaseous carbon dioxide "byproduct" generated by the first reaction to a calcium carbonate ($CaCO_3$) solid via the exothermic reaction,

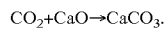
$CO_2 + CaO \rightarrow CaCO_3$.

As illustrated in FIG. 1, the larger nickel-plated alumina particles 24 are disposed in a loose "bed" 28 in the upper reaction chamber 16 such that, when gases are forcefully injected into the bottom of the bed through nozzles in the orifice plate 14, the particles rise up and are suspended above the plate in a looser, spaced-apart arrangement that enables the injected gases and smaller particles entrained therein to flow around and over the larger particles, as shown, thereby giving rise to the term "fluidized bed." The reactor is operated such that the large alumina/nickel catalyst particles remain within the bed at all times, while the smaller calcium oxide and calcium carbonate particles 26 and 30, which are entrained in the gaseous reactants described below, continuously flow through and out of the bed for subsequent gas/solid separation and reuse in the process.

The gaseous reactants employed in the process, viz., methane 32 and steam 34, are supplied to the reactor 10 from respective pressurized sources 36 and 38 thereof, while the calcium oxide particles 26 are supplied from a suitable dispenser/hopper 40 thereof. As illustrated in FIG. 1, the pressurized steam and methane are supplied to the lower, gas-manifold chamber 18 of the reactor as a mixture 35 thereof for injection into the base of the bed 28, as described in more detail below. The steam is also used to entrain a stream of calcium oxide particles in a two-phase "slurry," or "dense-phase," flow of the reactants in which the bulk density of the entrained calcium carbonate particles is at, or just below, the calcium oxide's static-bed bulk density of about 30 $lb_m/ft^3$. This dense-phase flow 42 of steam and calcium oxide particles is then injected into the base of the bed 28 through the high-velocity injector 20 in the manner described below. Additionally, it should be understood that, while steam is illustrated and described as the carrier gas for the entrained calcium oxide particles, in some applications, the carrier medium for the solids may be either steam, methane or a mixture 35 of the two gases.

The solid and gaseous reactants enter the base of the bed 28 through the orifice plate 14, as above, and react with each other in the presence of the nickel catalyst particles 24 in accordance with the reactions described above to produce a stream of the desired product, hydrogen gas 44, together with entrained particles 30 of the first byproduct, calcium carbonate. This two-phase flow is then processed in an apparatus 46, such as the high-speed "calciners" described in the above-referenced Related Applications, Ser. No. 10/869,643, entitled "DRY, LOW NITROUS OXIDE CALCINER INJECTOR", Ser. No. 10/869,644, entitled "HOT ROTARY SCREW PUMP", and Ser. No. 10/869,642, in which the hydrogen is first separated from the calcium carbonate, and the calcium carbonate then processed into a second, carbon dioxide gas 48 byproduct and calcium oxide particles 26, the latter being re-circulated through the reactor for reuse in the process.

While significant economic advantages have been demonstrated in the size, throughput, and single pass conversion efficiencies of the two-particle, fluidized-bed methane/steam reformer reactor 10 and process described above, certain technical problems have emerged that require resolution. One of these relates to the need to achieve a very uniform distribution and a rapid mixing of both the solid calcium oxide particles 26 and the steam/methane gas reactant mixture 35 across the bottom of the fluidized catalyst bed 28 of the reactor.

Figure 3:
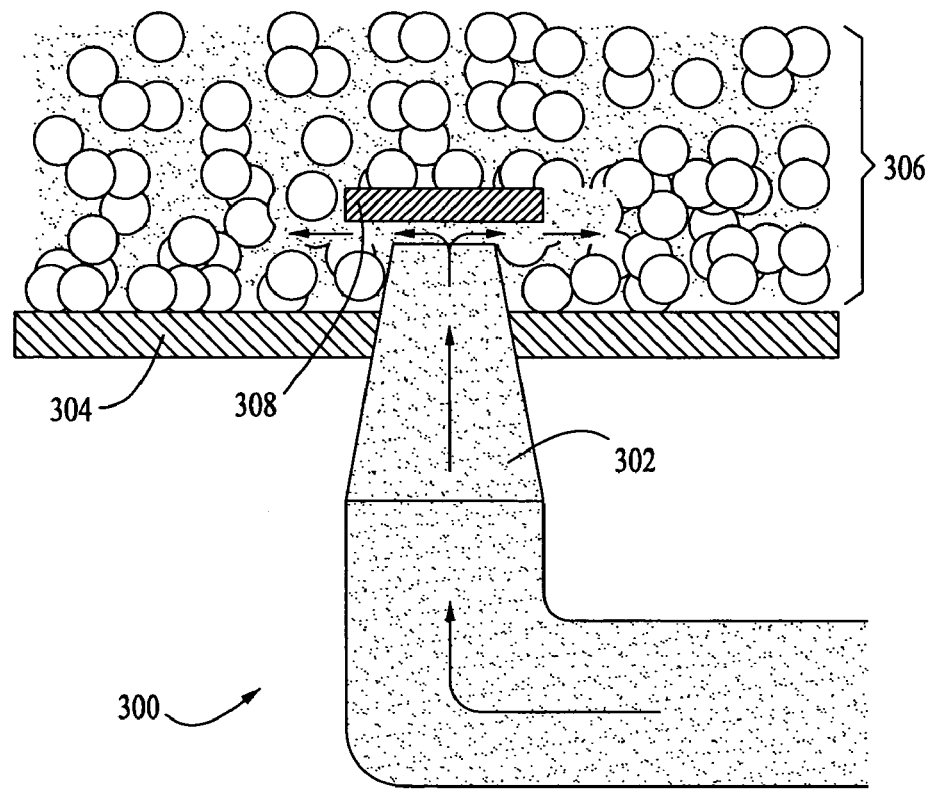
FIG. 3 is a partial cross-sectional elevation view of a prior art, tuyere-type of an injector for injecting reactants into the bed of a reactor.

In prior art reactors, all of the steam and methane reactants are mixed with the calcium oxide prior to their injection into the fluidized bed of the reactor by means of "tuyere"-type of injectors 300, such as the one illustrated in FIG. 3. A tuyere injector typically comprises a jet nozzle 302 that injects the reactants through a base plate 304 and into the bed 306 of the reactor such that the jet of reactants impinges on a diverter plate 308 that diverts and distributes the jet laterally for mixing with the particles of the bed, as shown by the arrows in FIG. 3. However, as will be understood by those of skill in this art, the volumetric flow rate of the gaseous steam/methane stream is much greater than the volumetric flow rate of the solids-entrained calcium oxide particle stream. This disparity in volumetric flow rates requires that much smaller volumetric amounts of steam or methane be used to transport the calcium oxide particles to ensure uniform "flow splitting" whenever multiple injectors are required, which is typically the case. As is known, a uniform splitting of entrained calcium oxide particle streams into multiple (i.e., on the order of 6 to 36) feed streams is problematic in dilute, two-phase pneumatic gas flows. Additionally, conventional tuyere-type injectors have been shown to be incapable of achieving a very uniform distribution and a rapid mixing of both the solid calcium oxide particles 26 and the steam/methane gas reactant mixture 35 across the entire bottom of the fluidized catalyst bed 28 of the reactor 10.

Figure 2:
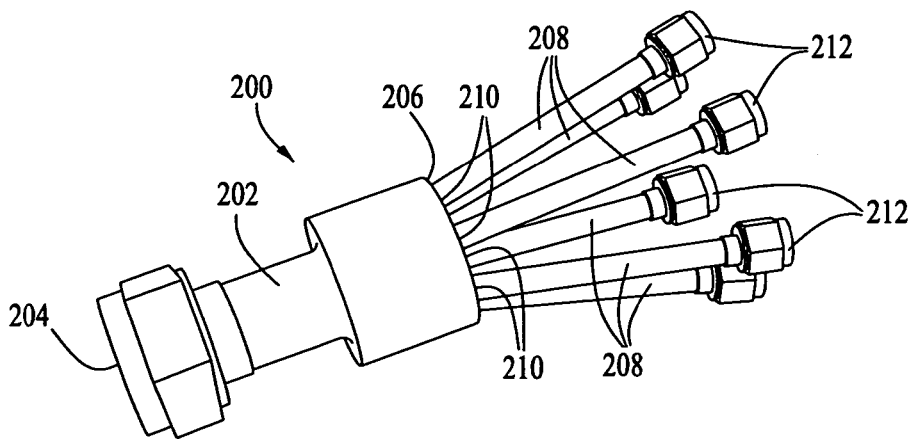
FIG. 2 is a perspective view of an exemplary embodiment of a dense-phase flow splitter in accordance with the present invention.

However, it has been discovered that efficient, highly accurate flow splitting characteristics can be achieved whenever the solids are transported in lines at or near their static-bed bulk densities (sometimes referred to as "dense-phase" or "slurry feeding"—see, e.g., Sprouse and Schuman, *AIChE Journal*, 29, 1000 [1983]). Such a flow splitting device 200 for achieving uniform flow splits with these kinds of slurries, or dense-phase flows, is illustrated in the perspective view of FIG. 2. In the particular embodiment illustrated, the flow splitter 200 comprises a "6-to-1" splitter, i.e., one that divides a single, dense-phase flow into six equal constituent dense-phase flows. However, other embodiments having greater or fewer numbers of constituent flows can also be confected.

The dense-phase flow splitter 200 comprises an elongated inlet tube 202 having an inlet end 204 and an outlet end 206, and a plurality of elongated outlet tubes 208 having respective inlet ends 210 coupled to the outlet end of the inlet tube, e.g., by soldering, welding, brazing, or epoxy encapsulation, such that the flow of a dense-phase stream entering the inlet end of the inlet tube is substantially equally diverted into, or divided among, the outlet tubes. To effect such a flow division without particle bridging and subsequent plugging, it is preferable that the following conditions be met: The internal cross-sectional areas of the respective outlet tubes should be approximately the same, and their total area should be about the same as that of the larger single inlet tube; any change in the axial direction of the flow of the stream through the splitter should be held to 10 degrees or less; there should be no upstanding discontinuities on any of the internal surfaces of the splitter, i.e., all surfaces should be kept as smooth as possible within reasonable manufacturing tolerances; and, of importance for the types of dense-phase flows contemplated by the present invention, the outlet tubes should be round, or annular in shape, and have a nominal diameter of not less than about 0.25 inches.

As illustrated in FIG. 1, in the apparatus and method of the present invention, an output end 212 of one of the smaller outlet tubes 208 of the flow splitter 200 is coupled to the high-velocity, rocket-style injector 20 of the reactor 10, while other ones of the splitter's outlet tubes may be connected to other injectors located in either the same or adjacent reactors. As discussed above, the dense-phase flow of reactants 42 supplied by the flow splitter to the injector comprises a gas, viz., steam, methane, or a mixture thereof, having calcium oxide particles 26 entrained therein at or just below the static-bed bulk density of the calcium oxide, viz., at about 30 $lb_m$/$ft^3$.

While the flow splitter 200 of the invention overcomes some of the problems associated with obtaining accurate, uniform splitting of dense-phase calcium oxide particle streams 42 into the reactor 10, it alone is not capable of overcoming the problem associated with the conventional tuyere injectors 300 described above, viz., an inability to achieve a uniform distribution and a rapid mixing of both the solid calcium oxide particle stream 42 and the steam/methane gas reactant mixture streams 35 across the entire bottom of the reactor bed 28. Subsequent rapid mixing of these streams with the circulating fluidized bed particles 24 is essential to prevent excessive hot spots within the bed, which could cause overheating of the reactor. This can result because the $CO_2$ reaction with calcium oxide is highly exothermic, and can potentially lead to local hot zones if not carefully counterbalanced by the highly endothermic methane/steam reaction. Good mixing and uniform dispersion of the methane, steam, and calcium oxide reactants with the particles of the fluidized bed at or near the bed's injectors is therefore important and necessary to ensure reliable reactor operation.

The present invention overcomes the rapid, uniform, fluidized-bed mixing problem of the prior art injectors 300 by the incorporation of one or more high-velocity, rocket-style, impinging injectors 20, along with adjacent base-bleed orifices 22, which are located in the orifice plate 14 of the reactor 10, as illustrated in FIG. 1, for an effective reactant dispersion into the reactor bed 28. As illustrated in the enlarged perspective view of the orifice plate 14 in FIG. 4, and in the enlarged cross-sectional view therethrough of FIG. 5, the novel injector 20 comprises a plurality of orifices contained in the plate and arranged in a particular pattern therein. Specifically, the injector comprises a primary, or central, orifice 60 that extends substantially perpendicularly through the plate, and one or more secondary, or peripheral, orifices 62 disposed adjacent to the central orifice and extending through the plate at such an angle that respective streams of reactants injected into the reactor bed through the one or more peripheral orifices impinge on a stream of reactants injected into the reactor bed through the central orifice, as indicated by the dashed line paths shown in FIG. 5.

Figure 5:
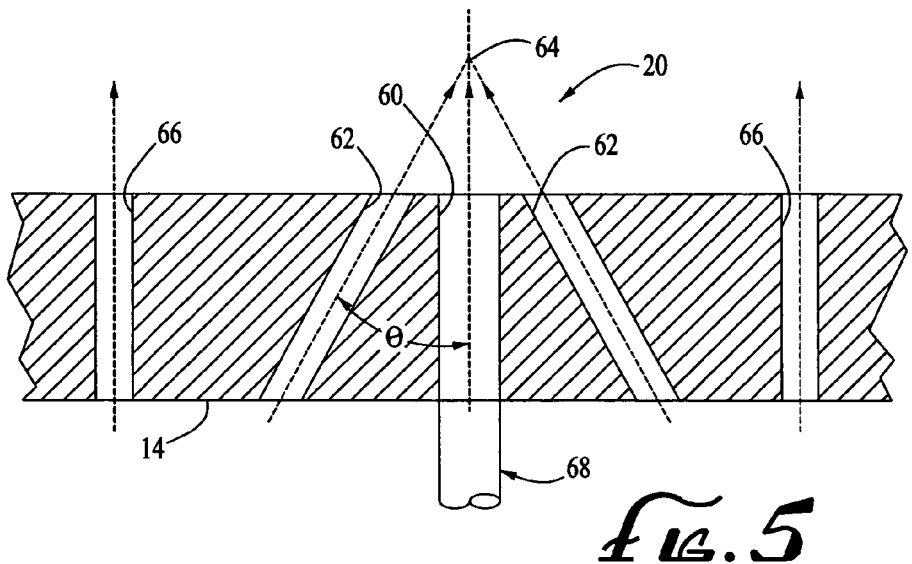
FIG. 5 is a partial cross-sectional view of the impinging injector of FIG. 4, as taken along the lines 5-5 in FIG. 4; and, FIG. 6 is a graph showing the relationships between selected operational parameters of an exemplary one-step, two-particle, fluidized-bed steam and methane reactor for the production of hydrogen.

In particular embodiment of the injector illustrated in FIG. 5, the peripheral orifices 62 are advantageously arranged in the orifice plate 14 such that the streams of reactants respectfully injected therethrough will impinge on the stream of reactants injected through the central orifice 60 at a common point 64, and at a common, acute angle θ, for a uniform, rapid mixing of the reactants. Of importance, the plate 14 further includes a plurality of "based-bleed" orifices 66 disposed around injector 20 and extending substantially perpendicularly through the plate for injecting additional streams of reactants into the reactor bed 28, as indicated by the dashed line paths of FIG. 5. In the illustrated example, the peripheral orifices 62 are located closer to the central orifice 60 and each of the plurality of "base-bleed" orifices 66. As described above in connection with FIG. 1, the stream of reactants 42 injected through the central orifice through a conduit 68 leading from an outlet tube 208 of the flow splitter 200 illustrated in FIG. 2 comprises a gas, i.e., steam, methane, or a mixture thereof, having calcium oxide particles 26 entrained therein at about the static-bed bulk density of particles, and the streams of reactants injected through the peripheral and the base bed orifices comprise a mixture 35 of steam and methane.

Figure 4:
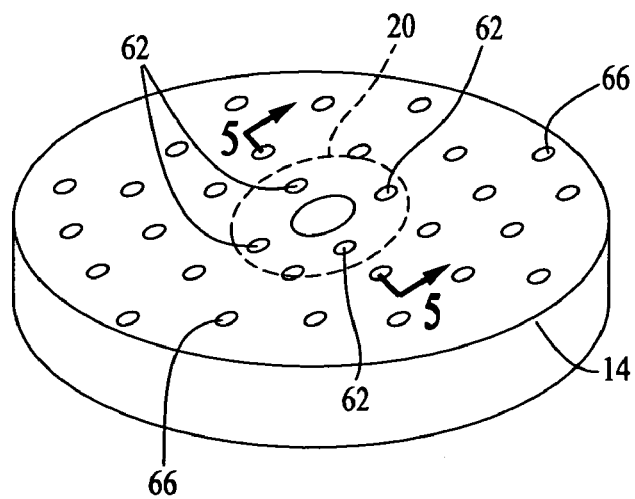
FIG. 4 is a perspective view of a reactor orifice plate incorporating an exemplary embodiment of a high-velocity, rocket-style impinging injector for injecting reactants into the bed of a reactor in accordance with the present invention, showing a "pentad," or 4-on-1 injector.

The particular exemplary embodiment of a high-velocity, rocket-style impinging injector 20 illustrated in FIGS. 4 and 5 is a "pentad," i.e., a 4-on-1 injector. However, other impinging injector configurations can be configured, such as "triplets" (2-on-1) and "doublets" (1-on-1), and so on. However, in all cases, the intent is the same, viz., the use of entrained calcium oxide stream flow splitters 200 for multiple solids injection operation, and high-velocity impinging injectors 20 acting on those streams to rapidly mix and spread the calcium oxide stream throughout the fluidized bed 28. Typically, these elements work best together when each solids injector 20 is flowing at a rate of approximately 0.14 to 2.5 $lb_m$/sec and at velocities of about 30 ft./sec. For larger injector orifice sizes, a screen 70 (see FIG. 1) of an appropriate mesh size may be required over the injection orifices 60, 62 and 66 to prevent solids, which are normally suspended above the orifice plate 14 by reactant flows, from dropping into the lower, pressurized-gas-manifold chamber 18 during shutdown of the fluidized bed reactor 10.

In operation, the pentad injector 20 illustrated feeds the entrained calcium oxide particles 26 stream from the outlet end 212 of one of the outlet tubes 208 of the flow splitter 200 through the central orifice 60 of the injector and into the bed 28 of the reactor 10. The solids bulk density within this stream should be at or just below the calcium oxide's static-bed bulk density of 30 $lb_m$/$ft^3$. The solids velocity exiting the central pentad passage should be between approximately 10 to 30 ft./sec. to prevent mechanical erosion of the line. Additionally, the minimum calcium oxide solids flow rate through the central orifice should be not less than approximately 0.05 $lb_m$/sec.

To ensure good mixing with the calcium oxide stream 42 through the central orifice 60, momentum and momentum-flux considerations require that the methane/steam-to-calcium oxide mass ratio be maintained at approximately 0.1, and that the gaseous methane/steam jet velocity be set at approximately 650 ft./sec through the peripheral orifices 62. For the overall fluidized bed operating conditions graphed in FIG. 6, this means that about 10 percent of the total steam/methane flow will be fed through the pentad's outer four impinging orifices, while the remaining 90 percent will be injected as a base-bleed flow through the base-bleed apertures 66 in the fluidized bed's orifice plate 14, as illustrated in FIG. 4. The total differential gaseous pressure drop across the orifice plate, i.e., between the lower, pressurized-gas-manifold chamber 18 and the upper, fluidized-bed reaction chamber 16, is approximately 13 psi for a fluidized bed operating at 7.8 atmospheres ("atm.") of pressure (absolute).

Figure 6:
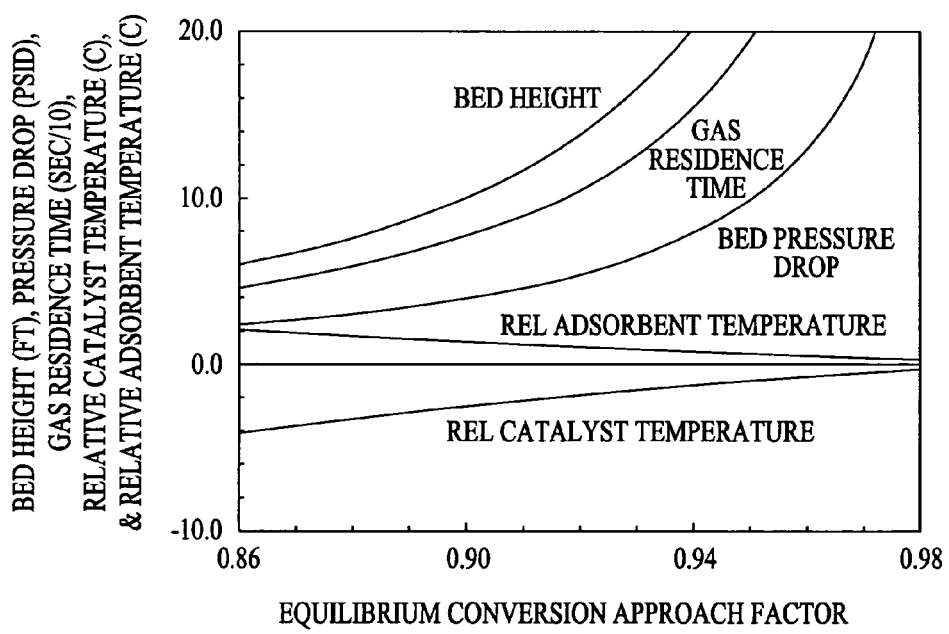

The general operational parameters for an exemplary $BOSH_2$ fluidized bed reformer 10 in accordance with the present invention have been mathematically modeled and are depicted graphically in FIG. 6. The molar steam-to-methane ratio of the injected reactants is approximately 4-to-1, while the molar calcium oxide-to-methane ratio is about 1.64-to-1. With catalyst particles 24 diameters on the order of 1.4 mm and calcium oxide adsorbent particle diameters on the order of 50 microns, the superficial gas velocity above the bed 28 is desirably set to approximately 2 m/s when the fluidized bed pressure is set at approximately 7.82 atm. of pressure.

By now, those of skill in the art will appreciate that the apparatus and processes of the present invention are highly "scalable" in terms of throughput and resulting hydrogen yields, and that indeed, many modifications, substitutions and variations can be made in and to their materials, configurations and implementation without departing from its spirit and scope. Accordingly, the scope of the present invention should not be limited to the particular embodiments illustrated and described herein, as they are intended to be merely exemplary in nature, but rather, should be fully commensurate with that of the claims appended hereafter and their functional equivalents.

What is claimed is:

1. A high-velocity, rocket-style impinging injector for injecting reactants into the bed of a two-particle, fluidized-bed reactor of a type used for the production of hydrogen from methane by a steam reforming process, said injector comprising:
a plate disposed horizontally within the reactor and below the fluidized bed thereof, the plate having:
a central orifice extending substantially perpendicularly through the plate; a peripheral orifice disposed adjacent to the central orifice and extending through the plate at a transverse angle relative to the central orifice such that a stream of reactants injected into the reactor bed through the peripheral orifice impinges on a stream of reactants injected into the reactor bed through the central orifice; and a plurality of base-bleed orifices disposed around the injector and extending substantially perpendicularly therethrough, wherein the peripheral orifice is located closer to the central orifice than each of the base-bleed orifices.

2. The injector of claim 1, further comprising a plurality of the peripheral orifices arranged in the plate such that the streams of reactants respectively injected therethrough impinge on the stream of reactants injected through the central orifice at a common, acute angle.

3. The injector of claim 2, wherein the respective streams of reactants injected through the peripheral orifices impinge on the stream of reactants injected through the central orifice at a common point.

4. The injector of claim 3, wherein:
the stream of reactants injected through the central orifice comprises a gas having particles of a solid entrained therein at about the static-bed bulk density of the particles; and,
the stream of reactants injected through the peripheral and the base-bleed orifices comprises a mixture of gases.

5. The injector of claim 4, wherein:
the stream of gas and entrained particles has an axial velocity of between about 10 to about 30 ft./sec.;
the solid comprises calcium oxide particles have a static-bed bulk density of about 30 $lb_m/ft^3$; and,
the mixture of gases comprises steam and methane.

6. The injector of claim 5, wherein:
the injector comprises four peripheral orifices;
the pressure in the fluidized bed of the reactor is about 7.8 atm absolute;
the ratio of the mass of the calcium oxide injected through the central orifice to the mass of the steam and methane mixture injected through the peripheral orifices is about 10 to 1;
the steam and methane mixture is injected into the reactor bed through the peripheral orifices at a velocity of about 650 ft./sec;
the percentage of the total flow of the steam and methane mixture injected into the reactor bed through the peripheral orifices is about 10 per cent;
the percentage of the total flow of the steam and methane mixture injected into the reactor bed through the base-bleed orifices is about 90 per cent; and,
the total differential pressure drop across the plate is about 13 psi.

7. A one-step fluidized-bed reactor for the production of hydrogen from methane by a steam reforming process, said reactor comprising:
an elongated vertical chamber;
a plate disposed horizontally within a lower portion of the reactor, the plate defining an upper, fluidized-bed chamber, a lower, gas-manifold chamber, at least one high-velocity, rocket-style impinging injector including a central orifice extending through the plate and at least one peripheral orifice disposed adjacent to the central orifice and extending through the plate at a transverse angle relative to the central orifice, and a plurality of base-bleed orifices disposed around the impinging injector and extending substantially perpendicularly through the plate that fluidly connect the upper fluidized-bed chamber and the lower gas-manifold chamber; and
a bed of particles disposed in the upper, fluidized bed chamber, the bed of particles including nickel-plated alumina particles.

8. The reactor of claim 7, wherein the transverse angle is an acute angle.

9. The reactor of claim 7, further comprising:
a dense-phase flow splitter that has an outlet tube that includes an outlet end that is coupled to the central orifice of the injector.

10. The reactor of claim 9, wherein:
the stream of gas and entrained particles has an axial velocity of between about 10 to about 30 ft./sec.; and,
the calcium oxide particles have a static-bed bulk density of about 30 $lb_m/ft^3$.

11. The reactor of claim 10, wherein:
the injector comprises four peripheral orifices;
the pressure in the fluidized bed of the reactor is about 7.8 atm., absolute;
the ratio of the mass of the calcium oxide injected through the central orifice to the mass of the steam and methane mixture injected through the peripheral orifices is about 10 to 1;
the steam and methane mixture is injected into the reactor bed through the peripheral orifices at a velocity of about 650 ft./sec;
the percentage of the total flow of the steam and methane mixture injected into the reactor bed through the peripheral orifices is about 10 per cent;
the percentage of the total flow of the steam and methane mixture injected into the reactor bed through the base-bleed orifices is about 90 per cent; and,
the total differential pressure drop across the plate is about 13 psi.

12. The reactor of claim 7, wherein the stream of second reactants comprises entrained solid particles and the stream of first reactants is substantially free of solid particles.

13. The reactor of claim 12, further comprising first particles disposed in the upper fluidized-bed chamber and second, different particles as the entrained solid particles.

14. The reactor of claim 13, wherein the first particles comprise nickel-plated alumina, and the second particles comprise calcium oxide.

15. The reactor of claim 7, wherein the central orifice and the at least one peripheral orifice extend along respective axes that define the transverse angle.

16. The reactor of claim 7, wherein the peripheral orifice is located closer to the central orifice than each of the plurality of bleed orifices.

* * * * *